United States Patent [19]

Wesseler

[11] 4,314,001

[45] Feb. 2, 1982

[54] NOVEL POLYMERIC COMPOUNDS, PROCESSES AND METHODS OF USE

[75] Inventor: Eugene P. Wesseler, Sharonville, Ohio

[73] Assignee: Sterling Drug Inc., New York, N.Y.

[21] Appl. No.: 126,995

[22] Filed: Mar. 3, 1980

[51] Int. Cl.$^3$ ..................... D06M 15/12; C08L 79/04; C08G 73/06; D21H 3/48

[52] U.S. Cl. .................................. 428/393; 428/274; 528/423; 252/8.8; 162/162; 106/308 N; 260/29.6 N

[58] Field of Search ......................... 252/8.8; 528/423; 428/274, 393

[56] References Cited

U.S. PATENT DOCUMENTS

| | | | |
|---|---|---|---|
| 2,884,383 | 4/1959 | Grundmann | 528/423 |
| 3,119,822 | 1/1964 | Engel | 260/249.5 |
| 3,301,797 | 1/1967 | Drucker | 528/423 |
| 3,309,345 | 3/1967 | Lutwack | 528/423 |
| 3,963,714 | 6/1976 | Gerendas et al. | 260/249.5 |
| 4,086,204 | 4/1978 | Cassandrini et al. | 528/423 |
| 4,180,664 | 12/1979 | Perrin et al. | 544/194 |

FOREIGN PATENT DOCUMENTS 7050652 10/1974 Japan .

7057390 10/1974 Japan .

OTHER PUBLICATIONS

Audebert; C. R. Acad. Sc. Paris vol. 268, 1969, pp. 1586–1589.

Millot et al. Bull. de la Soc. Chim. de France pt. 2, No. 5–6 pp. 1380–1386 (1975).

*Primary Examiner*—Maria Parrish Tungol

*Attorney, Agent, or Firm*—Terrence E. Miesle; Lynn T. Fletcher; B. Woodrow Wyatt

[57] ABSTRACT

Water-soluble triazine-nucleated polymeric quaternary ammonium compounds, which are prepared by the interaction of 2,4,6-trichloro-1,3,5-triazine with one molecular proportion of an aliphatic or cycloaliphatic diamine containing at least one tertiary nitrogen atom capable of being quaternized to effect polymerization and then with a second molecular equivalent of the same diamine or a different amine, are useful as mordants for water-soluble dyestuffs on cellulosic fibers; as fixing agents for pigments on cellulosic fibers; as softening agents for fibers; and as surface active agents for effecting aqueous dispersions of pigments and of colorless dyestuff precursors for carbonless duplicating systems.

5 Claims, No Drawings

NOVEL POLYMERIC COMPOUNDS, PROCESSES AND METHODS OF USE

BACKGROUND OF THE INVENTION (a) Field of the Invention

This invention relates to the field of chemistry and to products classified therein as quaternary ammonium compounds. More particularly, it relates to water-soluble triazine-nucleated polymeric quaternary ammonium compounds useful as mordants for water-soluble dyestuffs on cellulosic fibers, as fixatives for pigments on cellulosic fibers, as softening agents for fibers, and as surface active agents for effecting aqueous dispersions of pigments and of colorless dyestuff precursors for carbonless duplicating systems; to concentrated aqueous solutions of water-soluble triazine-nucleated polymeric quaternary ammonium compounds; to processes for preparing said water-soluble triazine-nucleated polymeric quaternary ammonium compounds; to mordanting water-soluble dyestuffs on cellulosic fibers with water-soluble triazine-nucleated polymeric quaternary ammonium compounds; to fixing pigments on cellulosic fibers with water-soluble triazine-nucleated polymeric quaternary ammonium compounds; to effecting aqueous dispersions of pigments and of colorless dyestuff precursors for carbonless duplicating systems utilizing water-soluble triazine-nucleated polymeric quaternary ammonium compounds as the surface active agents; and to softening fabrics by treating the fabrics with said water-soluble triazine-nucleated polymeric quaternary ammonium compounds.

(b) Description of the Prior Art

The following items to date appear to constitute the most relevant prior art with regard to the instant invention.

Japanese Patent Application Publication No. 39270/74, published Oct. 24, 1974, discloses triazine derivatives having the formula

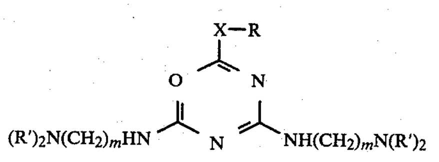

wherein R is saturated or unsaturated aliphatic alkyl having 3–18 carbon atoms, cycloalkyl having 3–6 carbon atoms, phenyl, substituted phenyl, cyanoethyl, dicyanoethyl, hydroxyethyl or dihydroxyethyl; X is —O—, —NH— or —N—; m is an integer of 2 or 3; and R′ is methyl, ethyl, n-propyl, isopropyl or butyl. The compounds are disclosed as being cationic surfactants, medicines or dyeing aids.

Japanese Patent Application Publication No. 39272/74, published Oct. 24, 1974, discloses triazine derivatives having the formula

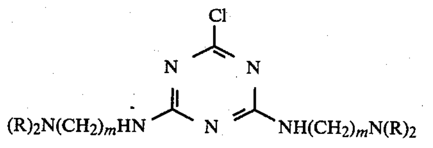

wherein m is an integer of 2 or 3; and R is a methyl, ethyl, n-propyl, isopropyl or butyl group. The compounds are disclosed as being useful as intermediates for the preparation of cationic active agents, medicines or dyeing aids.

U.S. Pat. No. 3,963,714, issued June 15, 1976, disclose and claim triazine compounds having the formula

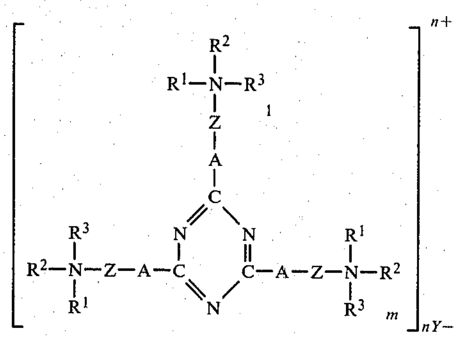

wherein A is an oxygen atom or a group of the formula —NR— in which R is hydrogen or alkyl of 1 to 4 carbon atoms, $R^1$, $R^2$ and $R^3$ are, each independently straight-chain or branched alkyl of 1 to 30 carbon atoms optionally hydroxy-substituted and/or interrupted by oxygen or nitrogen, or benzyl or chlorobenzyl, or $R^1$ and $R^2$ together form alkylene of 4 to 6 carbon atoms, k and m are, each independently, zero or 1, Z is optionally hydroxy- or methyl-substituted alkylene of 2 to 6 carbon atoms optionally interrupted by oxygen. $Y^-$ *is a monovalent organic or inorganic anion or is the x-th part of a x valent organic or inorganic anion, n equals the sum of* $1+k+m$, *provided that the total number of carbon atoms in* $R^1$, $R^2$ and $R^3$ is from 9 to 60 and the total number of carbon atoms in $R^1$, $R^2$ and $R^3$ of at least one ammonium group is not less than 5. The compounds are disclosed as being useful as retarders in dyeing anionic polyacrylonitrile fibers with basic dyes.

Audebert et. al. in Bulletin Societe Chimique France 1975 (5–6 Pt. 2) 1380–6 [Chemical Abstracts 83: 16463d (1975)] describe the preparation and physical characteristics of polymers prepared by interacting 2,4-dichloro-6-phenyl or morpholino-1,3,5-triazine and N,N′-(dialkyl)alkylenediamines. There is no indication of the utility of the compounds given in the reference.

Audebert et. al. in Comptes Rendus Academie Sciences, Paris Series C 1969 268(19) 1586–9 [Chemical Abstracts 71: 223–55n (1969)] describe the preparation and physical characteristics of polymers prepared from 2,4,6-trichloro-1,3,5-triazine or 2,4-dichloro-6-phenyl or piperidino-1,3,5-triazine and alkylenediamines. There is no indication of the utility of the polymers given in the reference.

U.S. Pat. No. 3,119,822, issued Jan. 28, 1964, discloses and claims quaternary ammonium compounds of the formula

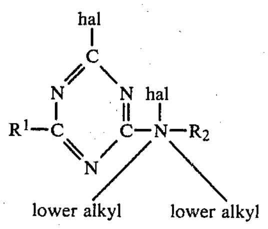

wherein $R_1$ means halogen, alkoxy, thioalkyl, amino, aminoalkyl, cycloalkyl, aminoaryl or aminoaralkyl groups, $R_2$ means a high molecular aliphatic radical, lower alkyl means the methyl or ethyl radical and hal means a halogen atom, e.g., chlorine or bromine which are useful as disinfectants.

U.S. Pat. No. 4,180,664, issued Dec. 25, 1979, discloses and claims a series of cationic compounds of the formula

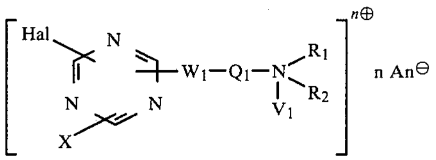

wherein Hal is a reactive halogen atom, x is halogen, lower alkoxy, lower alkylthio, phenoxy, phenylthio, $—NH_2$, —NH or the group of the formula $—N(Y_1)(Y_2)$ or $—W_2—Q_2—N(Y_1)(Y_2)(V_2)$, each of $W_1$ and $W_2$ independently are the direct bond, —N(Z)—, $—SO_2N(Z)—$ or —CON(Z)—, Z is hydrogen, lower alkyl or hydroxylower alkyl, each of $Q_1$ and $Q_2$ independently are an aliphatic or cycloaliphatic radical, selected from the group consisting of alkylene of 2 to 4 carbon atoms and cyclohexylene, each of $R_1$, $R_2$, $V_1$, $V_2$, $Y_1$ and $Y_2$ independently are lower alkyl or benzyl or lower alkyl or benzyl each of which is substituted by halogen, hydroxyl or cyano, $An^{\ominus}$ is the anion of an organic or inorganic acid, and n is 1 or 2. These compounds are disclosed as being fixing agents for anionic dyes in the dyeing of cellulosic fiber material.

SUMMARY OF THE INVENTION

The present invention provides for novel water-soluble triazine-nucleated polymeric quaternary ammonium compounds which are useful as surface active agents in the manufacture of aqueous dispersions of pigments and of colorless dyestuff precursors for carbonless duplicating systems; as mordants for use with water-soluble dyestuffs on cellulosic fibers in the manufacture of paper; as fixatives for use with pigments on cellulosic fibers in the manufacture of paper; and as a softening agent for fabrics.

In one of its composition of matter aspects, the invention relates to novel water-soluble polymeric quaternary ammonium compounds which are comprised of repeating units consisting of a 1,3,5-s-triazine unit bearing an aliphatic or cycloaliphatic alkylene diamine moiety in which one nitrogen atom is quaternized and which are useful as surface active agents in the preparation of dispersion compositions containing pigments and containing colorless dyestuff precursors for carbonless duplicating systems, as mordants for dyeing cellulosic fibers with water-soluble dyestuffs; as fixatives for coloring cellulosic fibers with pigments; and as softening agents for fabrics.

In a second of its composition of matter aspects, the invention relates to novel concentrated aqueous solutions of said water-soluble triazine-nucleated polymeric quaternary ammonium compounds.

In one of its process aspects, the invention relates to a process for preparing water-soluble triazine-nucleated polymeric quaternary ammonium compounds which comprises interacting, in a first step, 2,4,6-trichloro-1,3,5-triazine with a diamine containing at least one tertiary nitrogen atom capable of being quaternized to obtain polymerisation, and in a second step, the resulting polymeric monochlorotriazine product is interacted with the same or a different amine to further substitute the triazine ring.

In a second of its process aspects, the invention relates to a process for preparing water-soluble triazine-nucleated polymeric quaternary ammonium compounds which comprises interacting one molecular proportion of 2,4,6-trichloro-1,3,5-triazine with two molecular proportions of a diamine containing at least one tertiary nitrogen atom capable of being quaternized.

In one of its method of use aspects, the invention relates to a method of mordanting water-soluble dyestuffs on cellulosic fibers in the manufacture of dyed paper which comprises utilizing the water-soluble triazine-nucleated polymeric quaternary ammonium compounds of this invention as the mordants.

In a second of its method of use aspects, the invention relates to a method of fixing pigments on cellulosic fibers in the manufacture of pigmented paper which comprises utilizing the water-soluble triazine-nucleated polymeric quaternary ammonium compounds of this invention as the fixing agents.

In a third of its method of use aspects, the invention relates to a method for effecting the formation of a dispersion which comprises using the water-soluble triazine-nucleated polymeric quaternary ammonium compounds of this invention as surface active dispersion agent.

In a fourth of its method of use aspects, the invention relates to a method for softening fibers which comprises utilizing the water-soluble triazine-nucleated polymeric quaternary ammonium compounds of this invention as the softening agents.

DETAILED DESCRIPTION INCLUSIVE OF THE PREFERRED EMBODIMENTS

More specifically, this invention in one of its composition of matter aspects relating to final products, resides in the novel water-soluble polymeric quaternary ammonium compounds, which are particularly useful as surface active agents in the preparation of concentrated dispersions of pigments and the preparation of concentrated free-flowing aqueous dispersion compositions of colorless dyestuff precursors for carbonless duplicating systems, as mordants or fixatives in the coloration of cellulosic fibers with acid or direct dyestuffs or pigments, as softening agents for fibers and which are selected from the group of compounds consisting essentially of repeating units of the formula

FORMULA I

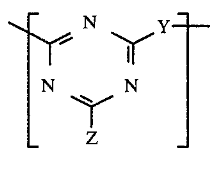

wherein Y represents a moiety selected from the group consisting of $—N^{\oplus}(CH_3)_2$-alkylene-NR— $An^{\ominus}$,

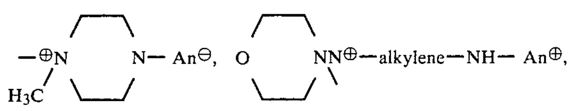

and $—N^{\oplus}(CH_3)_2$-alkylene-$N^{\oplus}(CH_3)_2$— $2An^{\ominus}$; Z represents a moiety selected from the group consisting of $—N(R^1)$-alkylene$^1$-$N(R^2)_2$, $—N^{\oplus}(CH_3)_2R^3\ An^{\ominus}$,

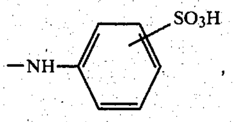

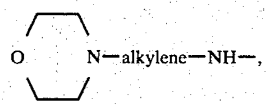

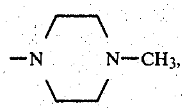

—NH-alkylene$^1$-$NR^4$-alkylene-$NH_2$ in which alkylene and alkylene$^1$ are each selected from the group consisting of $—CH_2CH_2—$, $—CH_2CH_2CH_2—$, and $—CH_2CH_2CH_2CH_2—$; R, $R^1$, $R^2$, and $R^4$ are each selected from the group consisting of hydrogen and non-tertiary $C_1$ to $C_4$ alkyl; $R^3$ is a non-tertiary $C_1$ to $C_{18}$ alkyl; and $An^{\ominus}$ is a monovalent anion.

In a first particular embodiment in accordance with its first composition of matter aspect, the invention sought to be patented resides in the novel water-soluble polymeric quaternary ammonium compounds of Formula I wherein Y is $—N^{\oplus}(CH_3)_2$-alkylene-NR— $An^{\ominus}$ and alkylene, R, $An^{\oplus}$ and Z each have the same respective meanings given in Formula I.

In a second particular embodiment in accordance with its first composition of matter aspect, the invention sought to be patented resides in the novel water-soluble polymeric quaternary ammonium compounds of Formula I wherein Y is

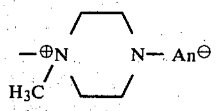

and $An^{\oplus}$ and Z each have the same respective meanings given in Formula I.

In a third particular embodiment in accordance with its first composition of matter aspect, the invention sought to be patented resides in the novel water-soluble polymeric quaternary ammonium compounds of Formula I wherein Y is

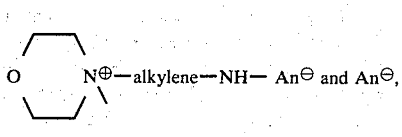

alkylene and Z each have the same respective meanings given in Formula I.

In a fourth particular embodiment in accordance with its first composition of matter aspect, the invention sought to be patented resides in the novel water-soluble polymeric quaternary ammonium compounds of Formula I wherein Y is $—N^{\oplus}(CH_3)_2$-alkylene-$N^{\oplus}(CH_3)_2$— $2An^{\ominus}$ and $An^{\ominus}$, alkylene and Z each have the same respective meanings given in Formula I.

This invention, in its second composition of matter aspect, resides in novel aqueous solutions of the water-soluble polymeric quaternary ammonium compounds of Formula I containing by weight of the entire composition approximately 10 to approximately 40 percent of a water-soluble polymeric ammonium compound.

In one of its process aspects, the invention sought to be patented resides in a process for preparing a water-soluble polymeric quaternary ammonium compound according to Formula I which comprises, in the first step, interacting one molecular proportion of 2,4,6-trichloro-1,3,5-triazine with one molecular proportion of an aliphatic or cycloaliphatic diamine containing at least one tertiary nitrogen atom capable of being quaternized to effect polymerisation, and in the second step, interacting the resulting water-soluble monochlorotriazine polymeric quaternary ammonium compound intermediate with one molecular proportion of the same or a different amine.

In a second of its process aspects, the invention sought to be patented resides in a process for preparing a water-soluble polymeric quaternary ammonium compound according to Formula I which comprises interacting one molecular proportion of 2,4,6-trichloro-1,3,5-triazine with two molecular proportions of a diamine containing at least one tertiary nitrogen atom capable of being quaternized.

In one of its method of use aspects, the invention sought to be patented resides in a method of mordanting water-soluble dyestuffs on cellulosic fibers in the manufacture of dyed paper which comprises treating said fibers in the form of an aqueous suspension with a water-soluble dyestuff and a water-soluble polymeric quaternary ammonium compound according to Formula I.

In a second of its method of use aspects, the invention sought to be patented resides in a method of fixing a water-insoluble pigment on cellulosic fibers in the manufacture of pigmented paper which comprises treating said fibers in an aqueous suspension with a pigment and a water-soluble polymeric quaternary ammonium compound according to Formula I.

In a third of its method of use aspects, the invention sought to be patented resides in a method for effecting the formation with concommitant stabilization of a dispersion of a solid selected from the group consisting of pigments and colorless dyestuff precursors in a predominantly aqueous system which comprises incorporating into said system the solid and a water-soluble polymeric quaternary ammonium compound according to Formula I.

In a fourth of its method of use aspects, the invention sought to be patented resides in a method for softening fibers which comprises treating said fibers with a water-soluble polymeric quaternary ammonium compound according to Formula I.

As used herein the terms "non-tertiary $C_1$ to $C_4$ alkyl", and "non-tertiary $C_1$ to $C_{18}$ alkyl" denote saturated monovalent straight or branched aliphatic hydrocarbon radicals including methyl, ethyl, propyl, isopropyl, butyl, isobutyl, amyl, 1-methylbutyl, 3-methylbutyl, hexyl, isohexyl, heptyl, isoheptyl, octyl, isooctyl, 2-ethylhexyl, nonyl, 3-ethylheptyl, n-decyl, n-undecyl, n-dodecyl, n-tridecyl, n-tetradecyl, n-pentadecyl, n-hexadecyl, n-heptadecyl, n-octadecyl, 1,3,5-trimethylhexyl, 1,5-dimethyl-4-ethylhexyl, 5-methyl-2-butylhexyl, 2-propylnonyl, 2-butyloctyl, 2-pentylnonyl, 1,2-dimethylhexadecyl, and the like.

As used herein, the term "$An^{\ominus}$" represents anion. By anion is meant any monovalent ion derived from an organic or inorganic acid, H anion, by removal of the acidic hydrogen ion. Exemplary anions are halide, hydroxy, alkanoate, nitrate, phosphate, alkylsulfate, and arylsulfate. Other monovalent anions are found in the literature, for examle, Hackh's Chemical Dictionary, 3rd Edition (1946) at pages 12–13, and Chemical Abstracts Vol. 56, Nomenclature, at pages 72n–80n, both incorporated herein by specific reference thereto. As is known, one anion can be changed to another anion by use of conventional ion exchange methods. The halides, i.e., chloride, bromide, fluoride and iodide and, in particular, chloride and bromide are particularly preferred as the anions for the water-soluble polymeric quaternary ammonium compounds of this invention.

The instant water-soluble polymeric quaternary ammonium compounds of this invention are useful as cationic surface active agents, that is, substances which possess the ability to change the surface properties, and more particularly, to promote the formation and stabilization of a dispersion of a solid in a liquid in the system in which they are incorporated. These substances, which generally have both hydrophilic and hydrophobic groups in the molecule, have the property of lowering the surface tension of the liquid in which they are dissolved or of reducing the interfacial tension between the solid and the liquid, even when used in very low concentrations.

It is the surface active property of these polymeric compounds which enables the compounds to be used in the preparation of stable concentrated free-flowing dispersion compositions of pigments for incorporation into aqueous suspensions of cellulosic fibers in the manufacture of paper and likewise the dispersion of colorless dyestuff precursors for incorporation into coating compositions for carbonless duplicating systems in the manufacture of carbonless duplicating pressure sensitive and thermal responsive systems.

The use of the stable concentrated free-flowing aqueous dispersion compositions is particularly advantageous in view of the increasing trend toward automation, because these dispersion compositions are conveniently handled and added in accurately measured amounts by means of pump and meters. The dispersion composition concentrates are particularly suited to metered operations because they are stable and freeflowing under ordinary storage conditions. Still another advantage of the dispersion compositions is that they readily disperse in the cellulosic fiber suspensions and in the coating systems and obviate the normal wetting out problems associated with dry pigments and colorless dyestuff precursors commonly used in the art. A further advantage of the concentrated dispersion compositions is that of convenience in handling and shipping. Furthermore, the concentrated dispersion compositions are more convenient for manufactures of paper and carbonless duplicating paper in that the problem of handling dry powdered pigments and colorless dyestuff precursors, with suspending the dry powder prior to its application, is eliminated.

Further is has been found that the instant water-soluble polymeric quaternary ammonium compounds of this invention are mordants for certain acid and direct water-soluble dyestuffs which are not substantive or which exhibit limited substantivity to cellulosic fibers. The polymeric compounds themselves are substantive to cellulosic fibers and when used in conjunction with acid or direct dyestuffs exhibit the property of holding the dyestuff to the cellulosic fiber. The treatment of the cellulosic fibers with the water-soluble polymeric quaternary ammonium compounds can be accomplished optionally before the addition of the dyestuff to the aqueous suspension of the cellulosic fibers, simultaneously with the addition of the dyestuff or after the dyestuff has been added to the aqueous suspension of cellulosic fibers with essentially no difference in the mordanting of the dyestuff. This mordanting of dyestuffs is particularly useful in the manufacture of absorbent grades of paper, for example, facial tissues, paper towels, napkins, and the like because the water-soluble polymeric quaternary ammonium compounds of this invention do not in any manner affect the absorbent properties of the paper products into which they have been incorporated as mordants for dyestuffs.

The instant water-soluble polymeric quaternary ammonium compounds of this invention are also useful as fixatives or retention aids to hold water-insoluble pigments on cellulosic fibers. Pigments generally have little or no substantivity for cellulosic fibers and need to be fixed to the fibers with agents, for example, alum and size both of which tend to make the paper harsh to the touch and not absorbent of liquids. The instant polymeric compounds, which are substantive to cellulosic fibers when used in conjunction with pigments, hold the pigments on the fibers. The treatment of the cellulosic fibers in an aqueous suspension with the water-soluble polymeric quaternary ammonium compounds can take place optionally before the pigment is added to the aqueous fiber suspension, simultaneous with the pigment addition, or after the pigment addition to the fiber suspension is complete with no apparent difference in the end results. This fixing of pigments is particularly useful in the manufacture of absorbent grades of paper such as that used in the manufacture of facial tissues, paper towels, napkins, etc. for the reasons previously discussed hereinabove.

It has been found that the water-soluble polymeric quaternary ammonium compounds of this invention have a high degree of substantivity for bleached cellulosic fiber such as is used in most disposable paper products. Moreover, they are absorbed by cellulosic fibers from aqueous solution at a very rapid rate. These properties are advantageous to the paper industry in view of the utilities of said polymeric quaternary ammonium compounds as mordants for dyestuffs and fixatives for pigments, because it allows the compounds to be added with the dyestuff or pigment to the pulp just prior to formation of the sheet.

The water-soluble polymeric quaternary ammonium compounds of this invention and, in particular, the compounds which contain the long chain alkylene moieties are suitable for use as softening agents for fibers. It is well known that textiles which have been washed in laundering operations, whereby detergent compositions, especially synthetic detergent compositions, have been used will acquire a harsh feel. This, of course, constitutes a significant disadvantage, particularly for those textiles which are worn and likely to come in direct contact with the skin. Generally this has been eliminated by the addition of a softening agent to the rinse cycle of the laundering operation. It has been found that fabric treated with a diluted solution of the polymeric quaternary ammonium compounds of this invention when compared to untreated fabric has a softer feeling to the touch.

In accordance with one of the process aspects of the present invention, the water-soluble polymeric quaternary ammonium compounds of Formula I are obtained by interacting, in a first step, approximately equimolecular proportions 2,4,6-trichloro-1,3,5-triazine and an aliphatic or cycloaliphatic diamine containing at least one tertiary nitrogen atom capable of being quaternized, for example, 3-(dimethylamino)propylamine, 1,2-bis(-dimethylamino)ethane, N-methylpiprazine, 3-N-(morpholino)-propylamine, 2-(dimethylamino)ethylamine, 2-(dimethylamino)-N-ethylethylamine. The reaction effecting polymerisation is carried out in an aqueous medium optionally having present in the reaction medium one or more of the following: a nonionic surface active agent, an antifoam agent and/or an alkaline substance, for example, sodium bicarbonate, potassium bicarbonate or triethanolamine at a temperature in the range of 0° to 10° C. The monochloro triazine intermediate thus formed is then interacted without isolation in a second step with an equimolecular proportion of an amine, either the same diamine as used in the first step or a different amine, for example, ethylenediamine, sulfanilic acid, trimethylamine, N,N-(dimethyl)-tridecylamine, propylenediamine, dipropylenetriamine or bis(3-aminopropyl)methylamine in the same aqueous medium at a temperature from 0° to 10° C. During the addition of the second amine or after the addition is complete, the reaction solution is adjusted to a pH in the range of 7.0 to 8.5 with the addition of an aqueous solution of an alkaline substance, for example, sodium hydroxide or potassium hydroxide. The water-soluble polymeric quaternary ammonium products which result can be obtained from the solution by methods well known in the art, for example, evaporation of the water either under vacuum or simply drying under ambient conditions. However, it is preferred not to isolate the final products because they are more readily used as water solutions thus eliminating the need to isolate them and redissolve them at the time of use. Further, some of the products are extremely hydroscopic and after several minutes exposed to ambient air they absorb sufficient water to dissolve and form syrups.

Optionally, the diamine of the first step and the amine of the second step may be combined so that there are two molecular proportions of amine, with at least one molecular proportion of an amine bearing a tertiary nitrogen atom, to interact with one molecular proportion of 2,4,6-trichloro-1,3,5-triazine. This is particularly preferred when the diamine and the amine are one and the same. The remainder of the procedure is as described hereinabove.

The aqueous solutions of the water-soluble polymeric quaternary ammonium compounds are prepared either by dissolving the isolated water-soluble polymeric quaternary ammonium compounds in water or preferably by not isolating the compounds from the reaction medium and adjusting the concentration to the desired percentage.

The water-soluble polymeric quaternary ammonium compounds of this invention can be isolated from the aqueous solution in which they are formed by techniques well known in the art, for example, concentration by evaporation. However, the water-soluble polymeric quaternary ammonium compounds thus formed are readily utilized in the form of aqueous solutions for many of their applications, especially in the preparation of aqueous dispersions of pigments and colorless dyestuff precursors and mordanting water-soluble dyestuffs and fixing water-insoluble pigments to cellulosic fibers while suspended in water. Accordingly, it is particularly preferred to retain the water-soluble polymeric quaternary ammonium compounds in a concentrated aqueous solution.

The diamines and other amines required as starting materials in the processes of this invention belong to well known classes of compounds and are either commercially available or readily obtained by conventional procedures well known in the art.

The 2,4,6-trichloro-1,3,5-triazine, more commonly known as cyanuric chloride, required as a starting material in the processes as this invention is well known and is commercially available. It is contemplated that other 2,4,6-trihalo-1,3,5-triazines would be equally operable in this invention. However, because of its ready availability and lower cost, cyanuric chloride is preferred.

The molecular structures of the water-soluble polymeric quaternary ammonium compounds were assigned on the basis of the modes of synthesis, physical characteristics and nuclear magnetic resonance spectroscopy.

The following examples will further illustrate the invention without, however, limiting it thereto.

EXAMPLE 1

With stirring, 100.0 ml of water and 0.25 ml of acetylenic glycol blend in ethylene glycol type nonionic surface active agent (Surfynol® TG, Air Products & Chemicals Inc.) was cooled to a temperature of 0°-3° C. by means of an external icewater bath and 9.2 g (0.05 mole) of ground cyanuric chloride was added. Slowly over approximately one hour while maintaining 0°-3° C., 10.2 g (0.1 mole) of 3-(dimethylamino)propylamine was added. While maintaining 0°-3° C., 3.0 ml of 20 percent aqueous sodium hydroxide was slowly added to adjust the pH above 7.0. After allowing the reaction mixture to warm to ambient temperature, an additional 3.0 ml of 20 percent aqueous sodium hydroxide was added to adjust the pH to 8.0. The mixture was filtered to remove a small amount of insolubles. The clarified solution was evaporated to dryness in a vacuum rotary evaporator and the resulting solid dried in a vacuum oven at 40°-45° C. overnight to obtain 19.2 g of a mixture of solid polymers having repeating units of the formula

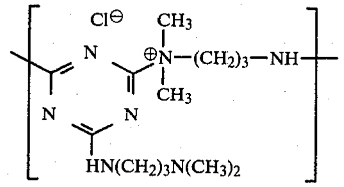

which melted over the range 109°-145° C. with gas evolution at 111° C.

The nuclear magnetic resonance spectrum was consistent with the assigned structure. The ultraviolet spectrum showed maxima at 218 and 267 millimicrons.

A clear 27.6 percent solution was prepared by dissolving 19.1 g of the product prepared above in 50.0 ml of water with stirring.

TEST FOR SUBSTANTIVITY

A 0.1 percent solution of the water-soluble polymeric quaternary ammonium compound prepared above was prepared by diluting 3.6 g of the 27.6 percent solution of polymeric quaternary ammonium compound obtained aboe to one liter volume with distilled water.

With stirring, 1.8 ml of the 0.1 percent polymeric quaternary ammonium compound solution was added to 100.0 g of an aqueous slurry containing approximately 3.0 g of bleached kraft pulp (700 Canadian Standard Freeness). Agitation was continued for approximately fifteen minutes prior to dilution with water to a volume of four liters with agitation. The treated pulp was then formed into an 8 by 8 inch square of paper by means of a filter-box saving the filtrate for ultra-violet spectral analysis for polymeric quaternary ammonium compound. The paper sheet was pressed between two blotters and then dried at 180° F. for four minutes between two fresh dry blotters to yield a uniform paper sheet. Four additional paper sheets were prepared adding 3.6 ml, 7.5 ml, 15.0 ml and 30.0 ml of 0.1 percent polymeric quaternary ammonium compound solution respectively to the pulp slurries.

The filtrates from the formulation of the paper sheets was then analyzed for milligrams of polymeric quaternary ammonium compound per milliliter of filtrate and this amount compared to the milligrams of compound charged to the pulp slurry. The percent in the filtrate is then calculated and subtracted from 100 percent to equal the percent substantivity. The results were as follows:

| Ml 0.1% Solution Added | Mg Polymeric Quaternary/ Ml in Pulp Slurry | Mg Polymeric Quaternary/ Ml in Filtrate | Percent Polymeric Quaternary in Filtrate | Percent Substantivity |
|---|---|---|---|---|
| 1.8 | 0.0107 | 0.0001 | 1 | 99 |
| 3.6 | 0.0213 | 0.0007 | 3 | 97 |
| 7.5 | 0.0411 | 0.0016 | 4 | 96 |
| 15.0 | 0.0789 | 0.0069 | 9 | 91 |
| 30.0 | 0.1460 | 0.0318 | 22 | 878 |

EXAMPLE 2

With stirring, a mixture of: 200.0 ml of water, 0.5 ml of acetylenic glycol blend in ethylene glycol type nonionic surface active agent (Surfynol ® TG, Air Products & Chemicals Inc.), 0.05 ml of antifoam agent (Antifoam ® A, Dow Corning Corp.) and 4.2 g of sodium bicarbonate was cooled to 3° C. and 36.8 (0.2 mole) of cyanuric chloride was added. Slowly over approximately thirty minutes, 20.4 g (0.2 mole) of 3-(dimethylamino)propylamine was added while maintaining 0°-5° C. After the addition was complete, the resulting mixture was stirred for approximately fifteen minutes during which time 22.5 g of 50 percent aqueous sodium hydroxide was added to adjust the pH to 6.5. To this mixture 12.0 g (0.2 mole) of ethylenediamine was gradually added over approximately thirty minutes while maintaining 0°-5° C. After stirring approximately thirty minutes gradually warming to room temperature, the resulting solution was allowed to set overnight at ambient temperature to obtain 283.0 g of pH 7.5 solution containing 14.6 percent of a mixture of solid polymers having repeating units of the formula

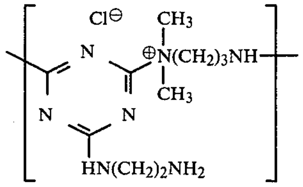

The ultraviolet spectrum of the solution showed a maximum at 216 millimicrons. The water-soluble polymeric quaternary ammonium compound had a 98 percent substantivity to paper pulp when paper sheets were prepared.

EXAMPLE 3

With stirring, a mixture of: 200.0 ml of water, 0.5 ml of acetylenic glycol blend in ethylene glycol type nonionic surface active agent (Surfynol ® TG, Air Products & Chemicals Inc.), 0.05 ml of antifoam agent (Antifoam ® A, Dow Corning Corp.) and 20.0 g of potassium bicarbonate was cooled to 0°-3° C. and 36.8 g (0.2 mole) of cyanuric chloride was added. Slowly over approximately one hour 20.4 g (0.2 mole) of 3-(dimethylamino)propylamine was added while maintaining 0°-5° C. To the resulting solution there was slowly added 34.6 g (0.2 mole) of sulfanilic acid simultaneously adjusting the pH to 6.5 with the addition of 19.7 ml of 50 percent aqueous sodium hydroxide. After the additions were complete, the pH rose to 8.5 and 2.0 ml of concentrated hydrochloric acid was added to adjust the pH to 7.6. The resulting solution was filtered to remove a trace of insolubles and to obtain 278.0 g of a solution containing 24.0 percent of a mixture of solid polymers having repeating units of the formula

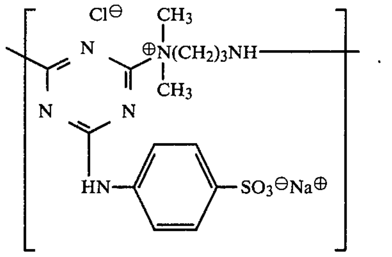

The ultraviolet spectrum of the solution showed maxima at 210 and 273 millimicrons.

The following table lists aqueous solutions of the water-soluble polymeric quaternary ammonium compounds prepared in a manner similar to that described in Example 1-3 above. The weight and gram moles of the reactants are so indicated in the columns (2-4) of the reactants. In column 2, the 2,4,6-trichloro-1,3,5-triazine (cyanuric chloride) reactant is listed. Generally, amine No. 1 listed in the third column was added to the cyanuric chloride slurried in the water containing the alkaline substance, bicarbonate, carbonate or triethanolamine so indicated in column six and the optional components listed in column nine. After the addition of the first amine was complete, amine No. 2 listed in the fourth column was added and the pH adjusted to greater than 7.0 by the addition of the second alkaline substance of column 6 as needed. The resulting solution was then analyzed by ultraviolet spectroscopy, the percent of the solution and the wavelength of the maximum so indicated in the eighth column. It was tested for its substantivity on cellulosic fibers according to the procedure described in Example 1 hereinabove and the percent substantivity found is indicated in the seventh column of the table.

| Example No. | Wt. & (Moles) of Cyanuric Chloride | Wt. & (Moles) of Amine #1 | Wt. & (Moles) of Amine #2 | Volume of Water | Wt. & Name of Alkaline Substances | Percent Substantivity | Percent Product (Ultraviolet Maxima in Millimicrons) | Amount Optional Components |
|---|---|---|---|---|---|---|---|---|
| 4 | 18.4g (0.1) | 19.9g (0.2) N-Methyl piperazine | None | 100 ml | 4.2g Sodium bicarbonate 6.8g Sodium hydroxide | 95.3 | 21.2 (232) | 0.25 ml Surface active agent[1] 0.05 ml Antifoam agent[2] |
| 5 | 12.3g (0.067) | 6.8g (0.067) 3-(Dimethylamino)-propylamine | 7.7 ml (0.067) 25% Trimethylamine | 66.6 ml | 6.7g Potassium carbonate | — | 16.0 (216) | 0.17 ml Surface active agent[1] 0.05 ml Antifoam agent[2] |
| 6 | 36.8g (0.2) | 20.1g (0.2) 3-(Dimethylamino)-propylamine | 35.5g (0.15) N,N-Dimethyltridecylamine | 200.0 ml | 35.6g Sodium bicarbonate | 81 | 30.0 (218) | 0.25 ml Surface active agent[1] 0.05 ml Antifoam agent[2] |
| 7 | 18.4g (0.1) | 26.0g(0.2) N-(2-Aminoethyl)morpholine | None | 100.0 ml | 4.2g Sodium bicarbonate | — | 25.3 (—) | 0.25 ml Surface active agent[1] 0.05 ml Antifoam agent[2] |
| 8 | 36.8g (0.2) | 23.0g (0.1) N,N,N', N'-Tetramethylethylenediamine | 12.0g (0.1) Ethylene diamine | 200.0 ml | 30.0g Triethanolamine | 81 | 16.6 (218) | None |
| 9 | 18.4g (0.1) | 24.2g (0.2) 2-(Aminoethyl)-1-ethylpyrrolidine | None | 100.0 ml | None | 90.5 | 24.7 (218) | 0.25 ml Surface active agent[1] |
| 10 | 18.4g (0.1) | 26.0g (0.2) N-(2-Hydroxyethyl)piperazine | None | 100.0 ml | None | 31 | 25.8 (233) | 0.25 ml Surface active agent[1] |
| 11 | 36.8g (0.2) | 20.1g (0.2) 3-Dimethylamino)-propylamine | 14.8g (0.2) Propylenediamine | 200.0 ml | 16.8g Sodium bicarbonate | 92.3 | 20.5 (217) | 0.25 ml Surface active agent[1] 0.05 ml Antifoam agent[2] |
| 12 | 74.0kg (400.0) | 41.3kg (400.0) 3-(Dimethylaminopropylamine | 24.1kg (400.0) Ethylenediamine | 231.01 | 25.4kg Sodium bicarbonate 18.8kg 50% sodium hydroxide | — | 18.0 (216) | 227.0g Surface active agent[1] 28.3g Antifoam agent[2]. |
| 13 | 18.4g (0.1) | 17.7g (0.2) unsym-Dimethylethylenediamine | None | 100.0 ml | 4.2g Sodium bicarbonate 8.5g 20% Sodium hydroxide | 98.3 | 19.7 (217) | 0.25 ml Surface active 0.05 ml Antifoam agent[2] |
| 14 | 18.4g (0.1) | 23.3g (0.2) N,N-Dimethyl-N'-ethylethylenediamine | None | 100.0 ml | 4.2g Sodium bicarbonate 6.1g 20% Sodium hydroxide | 79 | 23.1 (227) | 0.25 ml Surface active 0.05 ml Antifoam agent[2] |
| 15 | 36.8g (0.2) | 20.1g (0.2) 3-(Dimethylaminopropylamine | 20.6g (0.2) Diethylenetriamine | 200.0 ml | 25.2g Sodium bicarbonate | 89.8 | 21.7 (211) | 0.5 ml Surface active agent[1] 0.05 ml |

-continued

| Example No. | Wt. & (Moles) of Cyanuric Chloride | Wt. & (Moles) of Amine #1 | Wt. & (Moles) of Amine #2 | Volume of Water | Wt. & Name of Alkaline Substances | Percent Substantivity | Percent Product (Ultraviolet Maxima in Millimicrons) | Amount Optional Components |
|---|---|---|---|---|---|---|---|---|
| | | | | | | | | Antifoam agent[2] |
| 16 | 36.8g (0.2) | 20.1g (0.2) 3-(Dimethylaminopropylamine | 1.03g (0.1) Diethylenetriamine | 200.0 ml | 25.2g Sodium bicarbonate | 98.8 | 18.3 (216) | 0.5 ml Surface active agent[1] 0.05 ml Antifoam agent[2] |
| 17 | 36.8g (0.2) | 20.1g (0.2) 3-(Dimethylaminopropylamine | 29.0g (0.2) Methyliminobis(propylamine) | 200.0 ml | 8.4g Sodium bicarbonate | 100 | 24.8 (217) | 0.5 ml Surface active agent[1] 0.05 ml Antifoam agent[2] |
| 18 | 74.0kg (400.0) | 82.0kg (800.0) 3-(Dimethylamino)propylamine | None | 386.01 | 50% Sodium hydroxide to pH 7.0 | 95.9 | 22.0 (218) | 227.0g Surface active agent[1] |

FOOTNOTES
1 Surfynol® TG; Air Products and Chemicals Inc.
2 Antifoam A; Dow Corning Corp.
3 Tergitol® TP-9; Union Carbide Corp.

EXAMPLE 19

Following the procedure described in Japanese Patent Publication 39272/74, 50.0 ml of water was cooled to 3° C. and slowly 18.4 g (0.1 mole) of cyanuric chloride was added while maintaining 3°-5° C. by means of an external ice-water bath. Slowly 26.0 g (0.2 mole) of 3-(diethylamino)propylamine was added while maintaining 3°-12° C. by means of an ice-water bath. The resulting solution was stirred at ambient temperature for approximately eight hours and allowed to stand overnight. Slowly a 10 percent aqueous potassium carbonate solution was added to the reaction solution until it was slightly alkaline. The solid which precipitated was collected by filtration. The water wet filter cake was resuspended in water and dissolved by the addition of hydrochloric acid. Slowly 10 percent aqueous potassium carbonate was added until the mixture was slightly alkaline. The resulting solid was collected by filtration, washed with water and dried in vacuo to obtain 2-chloro-4,6-bis[3-(diethylamino)-propyl]amino-1,3,5-triazine, a water-insoluble, white colored solid which melted at 119° C.

Significant infrared maxima appeared at 3270 (N-H;s) and 3120 (N-H;s)$cm^{-1}$. A significant ultraviolet maximum appeared at 220 millimicrons. The nuclear magnetic resonance spectrum was in complete agreement with the assigned structure. Analysis by mass spectrum showed m/e peaks at 371($M^+$) and 342($M^+$-$C_2H_5$).

The 2-chloro-4,6-bis[3-(diethylamino)propyl]amino-1,3,5-triazine was prepared according to the Japanese patent publication for it to be compared with the product of Example 1 hereinabove as a fixative for pigments on cellulosic fiber and to compare its physical properties with the water-soluble polymeric quaternary ammonium compounds.

The use of the water-soluble polymeric quaternary ammonium compounds of Formula I and described in Examples 1 through 18 as fixatives for pigments is illustrated in the following examples.

EXAMPLE 20

A. A 0.2 percent stock pigment suspension was prepared by diluting 5.0 g of a commercial pigment dispersion containing 20.0 percent Pigment Blue 15 (C.I. 74160) (Cellutint® Blue 3G; Hilton-Davis Chemical Company Division) to 500.0 ml volume with distilled water.

B. A 0.1 percent stock solution of the water-soluble polymeric quaternary ammonium compound of Example 12 above was prepared by diluting 5.6 g of the 18 percent solution of polymeric quaternary ammonium compound solution obtained in Example 12 above to one liter volume with distilled water.

C. With stirring, 6.0 ml of the 0.2 percent pigment suspension prepared above was added to 100.0 g of an aqueous slurry containing approximately 3.0 g of bleached kraft pulp (700 Canadian Standard Freeness). Agitation was continued for approximately one hour prior to dilution with water to a volume of four liters with agitation. The dyed pulp was then formed into an 8 by 8 inch square of paper by means of a filter-box. The paper sheet was pressed between two blotters and then dried at 180° F. for four minutes between two fresh blotters to yield a uniformly colored very pale blue paper sheet.

D. With stirring, 6.0 ml of the 0.2 percent pigment suspension prepared above was added to 100.0 g of an aqueous slurry containing approximately 3.0 g of bleached kraft pulp (700 Canadian Standard Freeness). Agitation was continued for approximately five minutes and 7.5 ml of the 0.1 percent stock solution of the polymeric quaternary ammonium compound prepared above was added. Agitation was continued for approximately fifty-five minutes prior to dilution with water to a volume of four liters with agitation. The dyed pulp was then formed into an 8 by 8 inch square of paper by means of a filter-box. The paper sheet was pressed between two blotters and then dried at 180° F. for four minutes between two fresh dry blotters to yield a uniformly colored blue paper sheet.

E. With stirring, 6.0 ml of the 0.2 percent pigment suspension prepared above was added to 100.0 g of an aqueous slurry containing approximately 3.0 g of bleached kraft pulp (700 Canadian Standard Freeness). Agitation was continued for approximately five minutes and 7.5 ml of a 0.1 percent solution of 2-chloro-4,6-bis[3-(diethylamino)propyl]amino-1,3,5-triazine prepared by dissolving 1.0 g of the triazine prepared in Example 19 above in distilled water and diluting to one liter volume was added. Agitation was continued for approximately fifty-five minutes prior to dilution with water to a volume of four liters with agitation. The dyed pulp was then formed into an 8 by 8 inch square of paper by means of a filter-box. The paper sheet was pressed between two blotters and then dried at 180° F. for four minutes between two fresh dry blotters to yield a pale blue colored paper sheet.

F. The paper sheets prepared above were visually compared and ratings determined as to the pigment strength for each sheet. They were rated as follows:

| Paper Sheet From | Additive | Percent Pigment Strength |
|---|---|---|
| Part D | Polymeric Quaternary ammonium compound | 100 |
| Part E | 2-Chloro-4,6-bis[3-(diethylamino)propyl]amino-1,3,5-triazine | 4 |
| Part C | None | 2 |

EXAMPLE 21

A. A 0.2 percent stock pigment suspension was prepared by diluting 5.0 g of a commercial dispersion containing 20.0 percent of Pigment Yellow 14 (C.I. 21095) (Cellutint® Yellow 3G; Hilton-Davis Chemical Company Division) to 500.0 ml volume with distilled water.

B. A 0.1 percent stock solution of the water-soluble polymeric quaternary ammonium compound of Example 18 above was prepared by diluting 4.5 g of the 22.0 percent solution of polymeric quaternary ammonium compound solution obtained in Example 18 above to one liter volume with distilled water.

C. Following the procedure described in Example 20, part C above, 60.0 ml of the 0.2 percent Pigment Yellow 14 suspension prepared in part A directly above was incorporated with twenty minutes mixing in place of one hour into a very pale yellow-colored paper sheet.

D. Following the procedure described in Example 20, part E above, 60.0 ml of 0.1 percent Pigment Yellow 14 suspension prepared in part A directly above and 2.5 ml of the 0.1 percent solution of polymeric quaternary ammonium compound prepared in part B directly above were incorporated with twenty minutes mixing time in place of one hour, into a bright yellow-colored paper sheet.

E. The paper sheets prepared above were visually compared and ratings determined as to the pigment strength for each sheet. They were rated as follows:

| Paper Sheet From | Additive | Percent Pigment Strength |
|---|---|---|
| Part D | Polymeric quaternary ammonium compound | 100 |
| Part C | None | 1 |

-continued

The use of the water-soluble polymeric quaternary ammonium compounds of Formula I and described in Examples 1 through 18 as mordants for acid and direct water-soluble dye-stuffs is illustrated in the following examples.

EXAMPLE 22

A. A 0.1 percent stock dye solution was prepared by dissolving 1.0 g of Direct Blue 86 (C.I. 74180) in distilled water and diluting to one liter volume with distilled water.

B. A 0.1 percent stock solution of the water-soluble polymeric quaternary ammonium compound of Example 18 above was prepared by diluting 4.5 g of the 22 percent solution obtained in Example 18 above to one liter volume with distilled water.

C. With stirring, 7.5 ml of the 0.1 percent dye solution was added to 100.0 g of an aqueous slurry containing approximately 3.0 g of bleached kraft pulp (700 Canadian Standard Freeness). Agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° C. for four minutes between two fresh dry blotters to yield a uniformly dyed very pale turquoise paper sheet.

D. With stirring, 7.5 ml of the 0.1 percent dye solution was added to 100.0 g of an aqueous slurry containing approximately 3.0 g of bleached kraft pulp (700 Canadian Standard Freeness). After approximately five minutes 15.0 ml of the 0.1 percent stock solution of the water-soluble polymeric quaternary ammonium compound prepared above was added and agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° C. for four minutes between two fresh dry blotters to yield a uniformly dyed turquoise paper sheet.

E. With stirring, 15.0 ml of the 0.1 percent stock solution of the water-soluble polymeric quaternary ammonium compound prepared above was added to 100.0 g of an aqueous slurry containing approximately 3.0 g of bleached kraft pulp (700 Canadian Standard Freeness). After approximately five minutes 7.5 ml of the 0.1 percent dye solution was added and agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° C. for four minutes between two fresh blotters to yield a uniformly dyed turquoise paper sheet.

F. The sheets of paper prepared above were visually compared and ratings determined as to the dye strength for each sheet. They were rated as follows:

| Paper Sheet From | Additive & Time of Addition | Percent Dye Strength |
|---|---|---|
| Part E | Polymeric quaternary ammonium compound before dye | 100 |
| Part D | Polymeric quaternary ammonium compound after dye | 94 |
| Part C | None | 6 |

EXAMPLE 23

A. A 0.1 percent stock dye solution was prepared by dissolving 1.0 g of Acid Violet 49 (C.I. 42640) in distilled water and diluting to one liter volume with distilled water.

B. Proceeding in the manner described in Example 22, parts C, D and E above substituting 7.5 ml of the 0.1 percent stock solution of Acid Violet 49 prepared in part A above for 7.5 ml of the 0.1 percent stock solution of Direct Blue 86 three paper sheets were prepared. These sheets of paper were visually compared and rated as to the dye strength for each sheet. They were rated as follows:

| Paper Sheet From | Additive & Time of Addition | Percent Dye Strength |
|---|---|---|
| Part E | Polymeric quaternary ammonium compound before dye | 100 |
| Part D | Polymeric quaternary ammonium compound after dye | 61 |
| Part C | None | 2 |

EXAMPLE 24

A. A 0.1 percent stock solution was prepared individually of each of the following dyestuffs: Direct Red 81 (C.I. 28160); Direct Yellow 27 (C.I. 13950); Direct Yellow 12 (C.I. 24895); and Acid Red 137 (C.I. 17755) by dissolving 1.0 g of the individual dyestuff in distilled water and diluting to one liter volume with distilled water.

B. A 0.1 percent stock solution was prepared by diluting 5.6 g of a 18.0 percent solution of the polymeric quaternary ammonium compound obtained in Example 12 above to one liter volume with distilled water.

C. Following the procedure described in Example 22, part C above, 10.0 ml of the 0.1 percent stock solution of each of the dyestuffs prepared in part A above was individually incorporated into paper sheets.

D. Following the procedure described in Example 22, part D above, 10.0 ml of the 0.1 percent stock solutions of each of the dyestuffs prepared in part A above and 30.0 ml of the 0.1 percent stock solution of the polymeric quaternary ammonium compound solution were incorporated into paper sheets.

E. The paper sheets prepared above were visually compared and ratings determined as to the dye strength for each sheet. They were rated as follows:

| Dyestuff | Dye Strength with Polymeric Additive | Dye Strength with No Additive |
|---|---|---|
| Direct Red 81 | 100 | 60 |
| Direct Yellow 27 | 100 | 33 |
| Direct Yellow 12 | 100 | 50 |
| Acid Red 127 | 100 | 40 |

The use of the water-soluble polymeric quaternary ammonium compounds of Formula I and described in Examples 1 through 18 as surface active agents for the preparation of stable dispersions of pigments is illustrated in the following examples.

EXAMPLE 25

A. With stirring 928.0 g of a water wet filter cake containing 240.4 g of the pigment, 3-amino-4-methylbenzamide→3-hydroxy-2-naphthanilide, was added to 640.0 g of a solution prepared in a manner similar to that described in Example 12 above containing 115.2 g of the water-soluble polymeric quaternary ammonium compound. After stirring for approximately fifteen minutes, the conventional blade type laboratory agitator was replaced by a Eppenbach Homo-Mixer (Gifford-Wood Co., Hudson, N.Y.) and mixed for an additional half hour with the mixer running at an applied voltage of approximately 78 volts. The resulting dispersion contained 15.3 percent pigment and 7.3 percent water-soluble polymeric quaternary ammonium compound.

B. A 0.153 percent stock pigment suspension was prepared by diluting 1.0 g of the dispersion prepared in part A above to 100.0 ml volume with distilled water. With stirring, 4.0 ml of the 0.153 percent pigment suspension was added to 100.0 g of an aqueous slurry containing approximately 3.0 g of bleached kraft pulp (700 Canadian Standard Freeness). Agitation was continued for approximately one hour prior to dilution with water to a volume of four liters with agitation. The dyed pulp was then formed into an 8 by 8 inch square of paper by means of a filterbox. The paper sheet was pressed between two blotters and then dried at 180° F. for four minutes between two fresh dry blotters to yield a uniformly dyed scarlet paper sheet.

The use of the water-soluble polymeric quaternary ammonium compounds of Formula I and described in Examples 1 through 18 as surface active agents for the preparation of stable dispersions of colorless dyestuff precursors for carbonless duplicating systems is illustrated in the following examples.

EXAMPLE 26

Preparation of Dispersion

A mixture of: 2.5 g of 3,3-bis(4-dimethylaminophenyl)-6-dimethylaminophthalide; 0.5 g of benzoyl leuco methylene blue; 2.0 g of 3-[2,4-bis(dimethylamino)phenyl]-3-(4-dimethylaminophenyl)-6-dimethylaminophthalide; 1.0 g of a 20 percent aqueous solution of a water-soluble polymeric quaternary ammonium compound prepared in Example 12 above; 40.0 ml of water; and 80.0 g of ⅜ inch diameter steel grinding beads were placed in a container which was placed on a roller mill. Rolling was effected for approximately eighteen hours at ambient temperature. The steel beads were then removed by filtering the mixture through cotton cheesecloth.

The dispersion thus obtained containing by weight of the entire composition approximately 10.7 percent colorless dyestuff precursor, approximately 0.5 percent polymeric quaternary ammonium compound and approximately 88.8 percent water was incorporated into coating compositions which were used to prepare coated sheets for carbonless duplicating manifold systems.

Preparation and Testing of Coated Sheets in a Manifold System

A. With stirring 1.0 g of the dispersion prepared above, 2.5 g of powdered titanium dioxide, 5.2 g of water and 1.0 g of 5.0 percent aqueous polyvinyl alcohol (approximately 99 percent hydrolyzed) were uniformly mixed. The mixture was then evenly coated on sheets of paper using a coating rod (a stainless steel rod wound with No. 6 stainless steel wire) and the sheets air-dried. The paper thus coated with the colorless precursor was assembled as the bottom sheet in a manifold system by positioning the coated side (CF) in contact with the coated side of a commercially available transfer sheet as the top sheet coated on the back side (CB) with a wax coating containing a color developer of the electron accepting type. An image was then drawn with a stylus on the top sheet causing the color developer on its under side to transfer to the receiving sheet coated on its top side with the colorless precursor whereupon a strong red-blue-colored image promptly formed. The developed image exhibited good tinctorial strength and excellent xerographic copiability characteristics.

B. Proceeding in a manner similar to that described in part A above, but substituting calcium carbonate of a particle size of 0.75 micron for the titanium dioxide and a 5.0 percent aqueous solution of carboxymethylcellulose for the solution of polyvinyl alcohol, a pressure sensitive carbonless duplicating manifold system was prepared which produced a strong red-blue-colored quantitively identical image to that described in part A above.

C. Following the procedure described in part A above, but replacing the titanium dioxide with Ultrawhite ® 90 clay (Engelhard Mineral and Chemical Co.) and the 5.0 percent aqueous polyvinyl alcohol with a 5.0 percent aqueous starch solution, a pressure sensitive carbonless duplicating manifold system was prepared which produced a strong red-blue-colored quantitively identical image to that described in part A above.

EXAMPLE 27

A mixture of: 2.0 g of 2-anilino-3-methyl-6-diethylaminofluoran; 1.0 g of a 20 percent aqueous solution of a water-soluble polymeric quaternary ammonium compound prepared in Example 12 above; 35.0 ml of water; and 80.0 g of $\frac{3}{8}$ inch diameter steel grinding beads was charged into a container which was placed on a roller mill. Rolling was effected for approximately eighteen hours at ambient temperature. The steel grinding beads were removed by filtration through cotton cheesecloth.

The resulting dispersion containing by weight of the entire composition approximately 5.3 percent colorless dyestuff precursor, approximately 0.26 percent polymeric quaternary ammonium compound and approximately 94.4 percent water was then used to prepare a pressure sensitive carbonless duplicating manifold system similar to that described in Example 1, part A above. Impression with a stylus promptly produced a strong green-black-colored image on the bottom sheet (CF) which exhibited good tinctorial strength and excellent xerographic copiability characteristics.

EXAMPLE 28

A mixture of: 35.0 ml of distilled water; 30.0 g of 3,3-bis(4-dimethylaminophenyl)-6-dimethylaminophthalide; 7.5 g of a 20 percent aqueous solution of the water-soluble polymeric quaternary ammonium compound prepared in Example 12 above; and 70.0 g of 1/16 inch diameter glass beads was stirred vigorously at ambient temperature for approximately two hours utilizing a Hamilton-Beach No. 30 mixer (Hamilton-Beach Co., Racine, WIS.) equipped with a $1\frac{5}{8}$ inch diameter Cowles agitator blade at an applied voltage of approximately 50 volts. Microscopic examination of the resulting dispersion disclosed that the average particle size of the phthalide color precursor was between 1 and 3 microns. With stirring, 77.5 ml of distilled water was added to the dispersion and the glass beads were removed by filtration of the dispersion through cotton cheesecloth to obtain approximately 145.0 g of dispersion.

When the dispersion containing by weight of the entire composition approximately 20 percent colorless dyestuff precursor, approximately 1 percent polymeric quaternary ammonium compound and approximately 79 percent water was incorporated into a pressure sensitive carbonless duplicating manifold system similar to that described in Example 1, part A above, a strong blue-colored image having excellent tinctorial strength developed on the bottom sheet (CF) upon impression with a stylus.

The use of the water-soluble polymeric quaternary ammonium compounds of Formula I containing long chain alkylene moieties described in Example 6 as softening agents is illustrated in the following example.

EXAMPLE 29

A. A solution was prepared by diluting 122.7 g of the 22.0 percent water solution of the polymeric quaternary ammonium compound obtained in Example 6 above with 250.0 ml of warm tap water, adding 5.6 ml of 10 percent aqueous acetic acid and adjusting the resulting solution to 400.0 ml volume with warm tap water. The solution was warmed to 50° C. and padded on to cotton cloth having 80 threads by 80 threads per square inch. The treated cloth was air-dried and cut into pieces.

B. A blank solution was prepared by diluting 5.6 ml of 10 percent aqueous acetic acid to 400.0 ml volume with warm tap water. This blank solution was warmed to 50° C. and padded on to cotton cloth having 80 threads by 80 threads per square inch. The treated cloth was air-dried and cut into pieces.

C. Samples of each of the cotton cloths treated in parts A and B above were submitted to each of five members of test panel all of whom concluded that the cotton cloth from part A, treated with the water-soluble polymeric quaternary ammonium compound from Example 6 above, was softer than the cloth treated with the blank solution in part B above.

What is claimed is:

1. A method of softening fibers which comprises treating said fibers with a water-soluble polymeric quaternary ammonium compound consisting essentially of repeating units of the formula

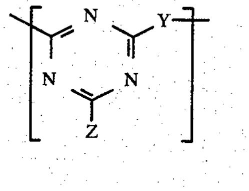

wherein:

Y represents a moiety selected from the group consisting of —N⊕$(CH_3)_2$—alkylene-NR- An⊖,

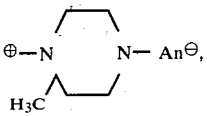, 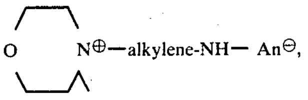, and —N⊕$(CH_3)_2$-alkylene-N⊕$(CH_3)_2$-2An⊖;

Z represents a moiety selected from the group consisting of —N($R^1$)-alkylene$^1$-N$(R^2)_2$, —N⊕$(CH_3)_2R^3$ An⊖,

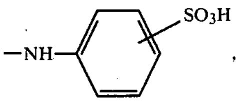, 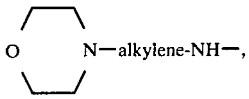,

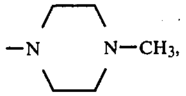,

—NH-alkylene$^1$-NR$^4$-alkylene$^1$-NH$_2$ in which alkylene and alkylene$^1$ are each selected from the group consisting of —$CH_2CH_2$—, —$CH_2CH_2CH_2$—and —$CH_2CH_2CH_2CH_2$—; R, $R^1$, $R^2$ and $R^4$ are each selected from the group consisting of hydrogen and non-tertiary $C_1$ to $C_4$ alkyl; $R^3$ is a non-tertiary $C_1$ to $C_{18}$ alkyl; and An⊖ is a monovalent anion.

2. A method of softening fibers which comprises treating said fibers with a water-soluble polymeric quaternary ammonium compound according to claim 1 wherein Y is N⊕$(CH_3)_2$-alkylene-NR- An⊖.

3. A method of softening fibers which comprises treating said fibers with a water-soluble polymeric quaternary ammonium compound according to claim 2 wherein alkylene is —$CH_2CH_2CH_2$—and R is hydrogen.

4. A method of softening fibers which comprises treating said fibers with a water-soluble polymeric quaternary ammonium compound according to claim 3 wherein Z is N⊕$(CH_3)_2R^3$ An⊖.

5. A method of softening fibers which comprises treating said fibers with a water-soluble polymeric quaternary ammonium compound according to claim 4 wherein $R^3$ is tridecyl and An⊖ is chloride.

* * * * *

UNITED STATES PATENT AND TRADEMARK OFFICE
CERTIFICATE OF CORRECTION

PATENT NO. : 4,314,001

DATED : February 2, 1982

INVENTOR(S) : Eugene P. Wesseler

It is certified that error appears in the above-identified patent and that said Letters Patent is hereby corrected as shown below:

Column 1, first formula between lines 40-45,

"

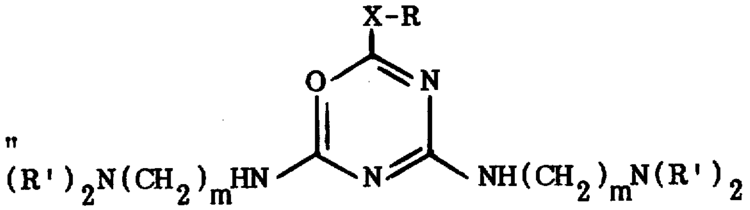

" should read

--

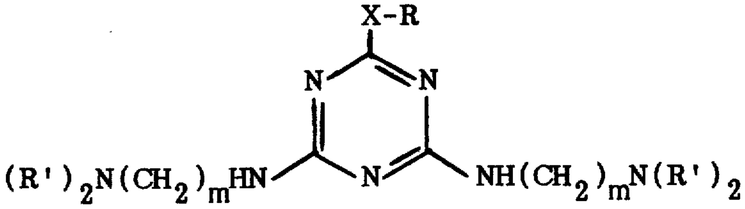

--.

UNITED STATES PATENT AND TRADEMARK OFFICE

CERTIFICATE OF CORRECTION

PATENT NO. : 4,314,001

DATED : February 2, 1982

INVENTOR(S) : Eugene P. Wesseler

It is certified that error appears in the above-identified patent and that said Letters Patent is hereby corrected as shown below:

Column 4, line 65,

" 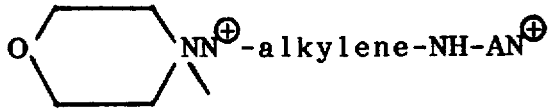 " should read

-- 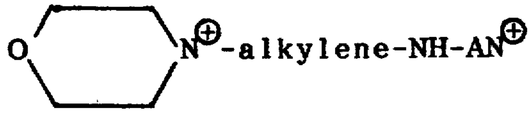 --.

Column 5, line 26, "An$^{\oplus}$" should read -- An$^{\ominus}$ --.

Column 5, line 38, "An$^{\oplus}$" should read -- An$^{\ominus}$ --.

Signed and Sealed this

*Twelfth* Day of *November 1985*

[SEAL]

*Attest:*

DONALD J. QUIGG

*Attesting Officer*

*Commissioner of Patents and Trademarks*